United States Patent
Ohta et al.

(10) Patent No.: US 6,403,150 B1
(45) Date of Patent: Jun. 11, 2002

(54) HEAT-SENSITIVE STENCIL AND METHOD OF FABRICATING SAME

(75) Inventors: Masayuki Ohta, Numazu; Takehiko Iwaoka, Yokohama; Fumiaki Arai, Mishima; Hiroshi Tateishi, Fujinomiya; Masanori Rimoto, Mishima; Hideki Ono, Miyagi-ken; Tetsuo Tanaka, Mishima; Yuji Natori, Numazu, all of (JP)

(73) Assignees: Ricoh Company, Ltd., Tokyo; Tohoku Ricoh Co., Ltd., Shibata-gun, both of (JP)

( * ) Notice: Subject to any disclaimer, the term of this patent is extended or adjusted under 35 U.S.C. 154(b) by 25 days.

(21) Appl. No.: 09/610,384

(22) Filed: Jul. 5, 2000

Related U.S. Application Data

(62) Division of application No. 09/138,667, filed on Aug. 24, 1998, now Pat. No. 6,096,374, which is a division of application No. 08/738,658, filed on Oct. 30, 1996, now Pat. No. 5,843,560.

(30) Foreign Application Priority Data

| Oct. 30, 1995 | (JP) | ................................................ 7-305102 |
| Dec. 28, 1995 | (JP) | ................................................ 7-354373 |
| May 10, 1996 | (JP) | ................................................ 8-140792 |

(51) Int. Cl.$^7$ .............................. B41N 1/24; B05D 1/32; B05C 17/06
(52) U.S. Cl. ................... 427/143; 427/282; 427/333; 427/336; 427/407.1; 427/421; 427/335; 101/127; 101/128.4
(58) Field of Search .................. 427/143, 282, 427/333, 336, 407.1, 421, 335; 118/504, 505; 101/127, 128.4

(56) References Cited

U.S. PATENT DOCUMENTS

| 4,091,727 A | 5/1978 | Hasegawa et al. |
| 4,957,808 A | 9/1990 | Arai et al. |
| 5,091,257 A | 2/1992 | Nonogaki et al. |
| 5,185,210 A | * 2/1993 | Zupancic ..................... 428/457 |
| 5,188,881 A | 2/1993 | Sugiyama et al. |
| 5,198,407 A | 3/1993 | Motegi et al. |
| 5,314,713 A | * 5/1994 | Mori et al. .................. 427/152 |
| 5,348,607 A | * 9/1994 | Wojnarowski et al. ....... 156/298 |
| 5,417,156 A | 5/1995 | Tateishi et al. |
| 5,593,586 A | * 1/1997 | Yamazaki et al. ........... 210/435 |
| 5,621,452 A | 4/1997 | Okumura |
| 5,648,451 A | * 7/1997 | Sashida et al. ............. 528/353 |
| 5,662,040 A | 9/1997 | Mori et al. |
| 5,707,712 A | 1/1998 | Fujimura et al. |

FOREIGN PATENT DOCUMENTS

| EP | 0 592 215 A2 | 4/1994 |
| EP | 0 642 929 A1 | 3/1995 |
| EP | 0 642 930 A1 | 3/1995 |
| EP | 0 647 533 A1 | 4/1995 |
| EP | 0 683 061 A1 | 11/1995 |
| GB | 2 176 621 A | 12/1986 |
| WO | WO 95/13924 | 5/1995 |

* cited by examiner

Primary Examiner—Shrive P. Beck
Assistant Examiner—Jennifer Kolb Michener
(74) Attorney, Agent, or Firm—Oblon, Spivak, McClelland, Maier & Neustadt, P.C.

(57) ABSTRACT

A heat-sensitive stencil having a thermoplastic resin film, and a porous resin layer formed thereon. The stencil has an air permeability in the range of 1.0 cm$^3$/cm$^2$·sec to 157 cm$^3$/cm$^2$·sec in a portion thereof when the thermoplastic resin film of the portion is perforated to form perforations providing an open ratio $S_O/S_P$ of at least 0.2, wherein $S_O$ represents a total area of the perforations and $S_P$ represents the area of the portion. The heat-sensitive stencil is prepared by applying a coating liquid containing the resin of the porous resin layer to the thermoplastic resin film and drying the coating. The coating liquid contains a mixture of a good solvent and a poor solvent less vaporizable than the good solvent so that the porous resin layer is formed after drying.

16 Claims, 4 Drawing Sheets

HEAT-SENSITIVE STENCIL AND METHOD OF FABRICATING SAME

This application is a divisional of Ser. No. 09/138,667, filed Aug. 24, 1998, now U.S. Pat. No. 6,096,374, which is a divisional of Ser. No. 08/738,658, filed Oct. 30, 1996, now U.S. Pat. No. 5,843,560.

BACKGROUND OF THE INVENTION

This invention relates to a heat-sensitive stencil and to a method of fabricating same.

One known heat-sensitive stencil is composed of an ink-permeable thin paper serving as an ink support and a thermoplastic resin film bonded with an adhesive to the support. The stencil is heated imagewise by, for example, a thermal head to perforate the heated portions of the thermoplastic resin film, thereby obtaining a printing master for reproducing images by mimeographic printing. The conventional stencil, however, poses problems because (1) the adhesive tends to be accumulated in interstices between fibers to form "fins" which prevent the thermal perforation during the master forming step and the passage of an ink during the printing step, (2) the fibers per se prevent smooth passage of an ink and (3) the paper support is relatively expensive.

To cope with the above problems, JP-A-54-33117 proposes a stencil having no paper support and composed substantially only of a thermoplastic resin film. While this stencil can completely solve the above-mentioned problems, a new serious problem arises; i.e. it is necessary to significantly increase the thickness of the stencil in order to obtain satisfactory stiffness required for transferring the stencil master during printing stage. An increase of the thickness results in the lowering of the thermal sensitivity.

JP-A 62-198459 discloses a method of fabricating a stencil wherein a multiplicity of closed patterns such as circular patterns are formed by gravure printing of a radiation-curable heat-resisting resin on a thermoplastic resin film, followed by curing. Since this method unavoidably gives patterns have a thickness of 50 μm or more, the formation of perforations with a thermal head is not easy. Further, ink stains are apt to be formed on prints obtained using such a stencil master.

SUMMARY OF THE INVENTION

It is, therefore, an object of the present invention to provide a heat-sensitive stencil having satisfactory stiffness and excellent sensitivity to thermal perforation.

Another object of the present invention is to provide a heat-sensitive stencil without an adhesive and paper.

It is a further object of the present invention to provide a heat-sensitive stencil of the above-mentioned type which can give a printing master capable of producing uniform, clear printings even with a small amount of an ink.

It is yet a further object of the present invention to provide a heat-sensitive stencil of the above-mentioned type which can give a printing master capable of producing printed images free of ink blurs and stains.

It is a further object of the present invention to provide a method which can easily fabricate a heat-sensitive stencil.

In accomplishing the foregoing objects, there is provided in accordance with one aspect of the present invention a heat-sensitive stencil comprising a thermoplastic resin film, and a porous resin layer formed thereon, said stencil having an air permeability in the range of 1.0 $cm^3/cm^2$ sec to 157 $cm^3/cm^2$·sec in a portion thereof when said thermoplastic resin film of said portion is perforated to form perforations providing an open ratio $S_O/S_P$ of at least 0.2, wherein $S_O$ represents a total area of said perforations and $S_P$ represents the area of said portion.

The provision of the porous layer can impart satisfactory stiffness to the stencil without adversely affecting the sensitivity to perforation thereof.

The air permeability of a printing master has been found to represent the ink permeability thereof. An air permeability of a printing master of below 1.0 $cm^3/cm^2$·sec even with an open ratio $S_O/S_P$ of 1.0 means that the porous resin layer has a low porosity and that the master has poor ink permeability. On the other hand, an air permeability in excess of 157 $cm^3/cm^2$·sec means that the porous resin layer has poor ink retentivity so that stains and blurs are apt to be formed.

In another aspect, the present invention provides a method of preparing a heat-sensitive stencil, comprising the steps of:
(a) dissolving a resin in a mixed solvent including a first solvent capable of dissolving said resin, and a second solvent substantially incapable of dissolving said resin and having an evaporation rate lower than that of said first solvent, thereby to obtain a coating liquid;
(b) applying said coating liquid over a surface of a thermoplastic resin film to form a resin coating; and
(c) heating said resin coating to dryness.

The present invention also provides a method of preparing a heat-sensitive stencil, comprising the steps of:
(a) applying a solution of a resin in a first solvent over a surface of a thermoplastic resin film to form a wet resin coating over said surface;
(b) spraying vapors or fine droplets of a second solvent substantially incapable of dissolving said resin over said wet resin coating so that said second solvent is taken into said wet resin coating to cause a portion of said resin to precipitate; and
(c) heating said resin coating to dryness.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

The heat-sensitive stencil according to the present invention has a porous resin layer serving as an ink support and formed on a thermoplastic resin film. The stencil is adapted show an air permeability in the range of 1.0 cm$^3$/cm$^2$·sec to 157 cm$^3$/cm$^2$·sec, preferably 10 cm$^3$/cm$^2$·sec to 80 cm$^3$/cm$^2$·sec, in a portion thereof when the thermoplastic resin film of that portion is perforated to form perforations providing an open ratio $S_O/S_P$ of at least 0.2, wherein $S_O$ represents a total area of the perforations and $S_P$ represents the area of the portion.

The air permeability may be measured in the following manner. A square solid pattern (black pattern) with a size of 10×10 cm is read by a printer (PRIPORT VT 3820 manufactured by Ricoh Company, Ltd.) and a sample stencil is perforated with a thermal head in accordance with the read out pattern to form a printing master. The perforation operations are performed for five similar samples so that five printing masters having open ratios $S_O/S_P$ of about 0.2, 0.35, 0.50, 0.65 and 0.80 are obtained. The open ratio of a master may be measured by making a photomicrograph (magnification: 100) thereof. The photomicrograph is then magnification-copied (magnifying ratio: 200) using a copying machine (IMAGIO MF530 manufactured by Ricoh Company, Ltd.). Perforations shown in the copy are marked on an OHP film and then read by a scanner (300 DPI, 256 gradient). This is binarized with an image retouch software Adobe Photoshop 2.5J. The open ratio of the perforations is measured using an image analysis software NIH IMAGE. The perforated portion of each of the printing masters is measured for the air permeability thereof by any conventional method. When at least one of the five masters has an air permeability in the range of 1.0 cm$^3$/cm$^2$·sec to 157 cm$^3$/cm$^2$·sec, the stencil is regarded as falling within the scope of the present invention.

Figure 1:
FIG. 1 is an electron microphotograph of a porous resin layer of a heat-sensitive stencil according to the present invention.
Figure 2:
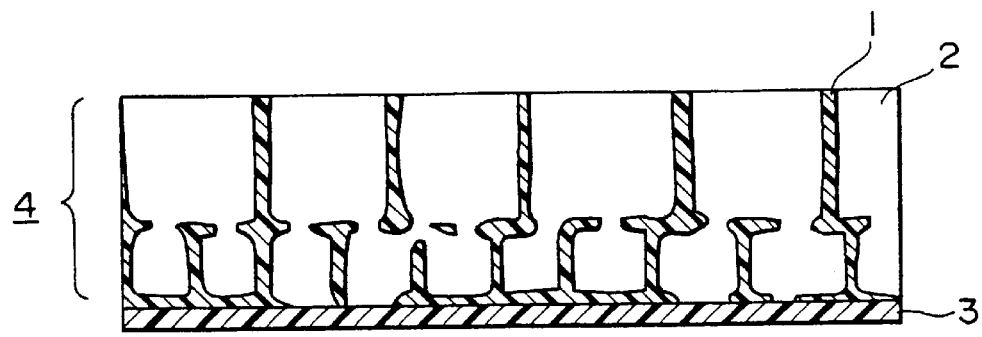
FIG. 2 is a sectional view schematically illustrating a heat-sensitive stencil according to the present invention.

FIG. 1 is an electron microphotograph of an example of a porous resin layer. A plurality of pores of an open cellular structure are present. FIG. 2 is a sectional view schematically illustrating one embodiment of a stencil according to the present invention. Designated as 3 is a thermoplastic resin film on which a porous resin layer 4 having pores 2 defined by resin walls 1 is formed.

The porous layer 4 preferably has an average pore diameter of 2–50 μm, more preferably 5–30 μm, for reasons of proper ink permeability.

It is preferred that the total area Sp of the openings of the porous resin layer 4 having an equivalent diameter of at least 5 μm, preferably 5–50 μm, be 4–80%, more preferably 10–60%, of a total area S of the surface of the porous resin layer 4 for reasons of proper ink passage therethrough and proper capability of the formation of perforations. The term "openings" herein refers to pores 2 exposed to a surface of the layer 4 and the term "equivalent diameter" refers to a diameter of a circle having the same area as that of the corresponding "opening". The total area of the openings may be measured from an electron microphotograph (magnification: 1,000) of the surface of the porous resin layer 4. The photograph is processed by an image processor (LA-555D manufactured by Pierce Inc.) for determining the diameter of the circle corresponding to the opening.

It is also preferred that the total area of the openings having an equivalent diameter of at least 5 μm, preferably 5–50 μm, is at least 50% of a total area of the openings for reasons of proper ink passage therethrough and proper capability of the formation of perforations.

The porous resin layer 4 preferably has a thickness of 5–100 μm, more preferably 6–50 μm, for reasons of proper stiffness of the stencil and proper ink transference. The density of the porous resin layer 4 is preferably 0.01–1 g/cm$^3$, more preferably 0.1–0.7 g/cm$^3$, for reasons of proper stiffness and mechanical strengths.

For reasons of proper transferability of the printing master in the printer, it is preferred that the stencil has a flexural rigidity of 5–200 mN, more preferably 10–50 mN, when measured with a Lorentzen Stiffness Tester.

Any resin may be used for the formation of the porous layer 4. Illustrative of suitable resins of the porous layer 4 are a vinyl resin such as poly(vinyl chloride), poly(vinyl butyral), vinyl chloride-vinyl acetate copolymer, vinyl chloride-vinylidene chloride copolymer or vinyl chloride-acrylonitrile copolymer; a polyamide such as nylon; polybutylene; polyphenylene oxide; (meth)acrylic ester; polycarbonate; or a cellulose derivative such as acetylcellulose, acetylbutylcellulose or acetylpropylcellulose. These resins may be used singly or in combination of two or more. It is preferred that the porous resin layer 4 contain a resin capable of softening at a temperature at which the perforation by a thermal head is carried out, generally at a temperature of 150° C. or less, for reasons of facilitating the perforation of the thermoplastic resin film 3.

The porous resin layer 4 can contain one or more additives such as a filler, an antistatic agent, a stick-preventing agent, a surfactant, an antiseptic agent and an antifoaming agent. Addition of a filler to the porous resin layer 4 is desirable to control the strength, stiffness and the size of pores thereof. Use of a filler in the form of needles or plates is particularly preferred. Illustrative of suitable fillers are needle-like natural mineral fillers such as magnesium silicate, sepiolite, potassium titanate, wollastonite, zonolite and gypsum fiber; needle-like synthetic mineral fillers such as non-oxide-type needle whiskers, oxide whiskers and mixed oxide whiskers; platy fillers such as mica, glass flakes and talk; and pigments such as poly(vinyl chloride) particles, poly(vinyl acetate) particles, polymethyl acrylate particles, zinc oxide, titania, calcium carbonate and microcapsules (e.g. Matsumoto Microsphere). The filler is generally used in an amount of 8–20% based on the weight of the resin of the porous resin layer.

Any thermoplastic resin conventionally used in heat-sensitive stencil master may be used for the film 3. Illustrative of suitable thermoplastic resins are vinyl chloride-vinylidene chloride copolymers, polypropylene and polyesters. A polyester film having melting energy of 3–11 cal/g (JP-A-62-149496), a polyester film having a degree of crystallization of 30% or less (JP-A-62-282983) and a polyester film containing at least 50 mol % of butylene terephthalate units (JP-A-2-158391) are particularly preferred because they permit perforation with a low energy. The thermoplastic resin film 3 preferably has a thickness of 0.5–10 μm, more preferably 1–5 μm for reasons of easiness in formation of the porous layer 4 thereon and in formation of perforations.

If desired, the thermoplastic resin layer 3 may be backed by a stick preventing layer (not shown) containing a stick preventing agent such as a silicone mold release agent, a fluorine resin mold release agent or a phosphoric ester surfactant.

Figure 3:
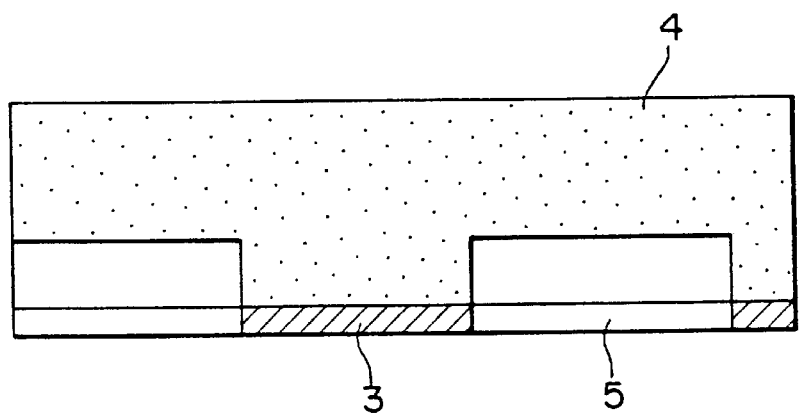
FIG. 3 is a sectional view schematically illustrating a state of a heat-sensitive stencil according to the present invention where perforations have been formed.

FIG. 3 schematically illustrate the state where the stencil has been processed by a thermal head to form perforations 5. In the illustrated case, the thermoplastic resin layer 3 is perforated with part of the porous resin layer 4 in each of the perforations 5 remaining unremoved and covering the perforations 5. The remaining portion of the porous resin layer 4 serves to control the amount of ink transferred from the master to a paper during the mimeographic printing stage.

Such remaining portion of the layer 4 can be formed by suitably adjusting the thickness of the layer 4.

One preferred method (first embodiment) of fabricating the above heat-sensitive stencil will be next described. A resin for forming the porous resin layer 4 is first dissolved, completely or partly, in a mixed solvent including a first solvent (good solvent) capable of dissolving the resin and a second solvent (poor solvent) substantially incapable of dissolving the resin and having a lower evaporation rate than the first solvent, thereby to obtain a coating liquid in the form of a solution or a dispersion. Preferably the second solvent has a boiling point which is higher by 10–40° C. than that of the first solvent and which is preferably 150° C. or less.

The concentration of the resin in the mixed solvent solution is generally 2–50% by weight, preferably 5–30% by weight. The weight ratio of the first solvent to the second solvent, which has an influence upon the pore structure of the porous resin layer 4, is generally 40:60 to 95:5.

The thus obtained coating liquid is then applied over a surface of a thermoplastic resin film to form a wet resin coating. The application of the coating liquid may be carried out by any desired coating method such as blade coating, transfer roll coating, wire bar coating, reverse roll coating or gravure coating. In this case, it is preferred that the coating liquid immediately before being applied be heated at a temperature higher than that of the atmosphere at which the coating step is performed and which is generally room temperature. Thus, when the coating is performed with a die coater, the die from which the solution is applied to the thermoplastic resin film may be surrounded by a heating jacket to which a heating medium is fed. It is also preferred that coating liquid immediately after being applied to the thermoplastic resin film be cooled before the next drying step to a temperature lower by 2–30° C., preferably 5–20° C., than that of the coating liquid immediately before being applied.

The wet resin coating is then heated at a temperature below the boiling point of the second solvent but sufficient to vaporize part of the first solvent so that a portion of the resin precipitates. Subsequently, the coating is further heated preferably at 80° C. or less until the coating is completely dried. During the course of the vaporization of the solvents, there are formed a multiplicity of pores.

Examples of suitable poor and good solvents are shown in Table 1 below. As shown, good and poor solvents vary with the resin to be dissolved.

TABLE 1

| Solvent (b.p. ° C.) | Resin | | | | | |
|---|---|---|---|---|---|---|
| | PVC*1 | VCA*2 | FB*3 | PS*4 | ANS*5 | ABS*6 |
| Methanol (64.5) | poor | poor | poor | poor | poor | poor |
| Ethanol (78.3) | poor | poor | poor | — | — | poor |
| Ethyl acetate (77.1) | — | good | poor | good | good | — |
| Acetone (56.1) | good | good | poor | good | good | good |
| Methyl ethyl ketone (79.6) | good | good | poor | good | good | good |
| Diethyl ether (34.5) | poor | — | — | poor | poor | poor |
| Tetrahydrofuran (65–67) | good | good | good | good | — | — |
| Hexane (68.7) | poor | poor | good | poor | poor | — |
| Heptane (98.4) | poor | poor | poor | poor | poor | poor |
| Benzene (80.1) | — | poor | good | good | good | good |
| Toluene (110.6) | — | good | good | good | good | good |
| xylene (139.1) | — | good | good | good | good | good |
| Chloroform (61.2) | — | good | good | good | good | good |
| Carbon tetrachloride (76.7) | — | good | good | good | — | — |
| Water (100.0) | poor | poor | poor | poor | poor | poor |

TABLE 1-continued

| Solvent (b.p. ° C.) | Resin | | | | | |
|---|---|---|---|---|---|---|
| | MAR*7 | FVA*8 | PC*9 | AC*10 | AR*11 | VB*12 |
| Methanol (64.5) | — | good | poor | — | poor | good |
| Ethanol (78.3) | — | poor | poor | — | poor | good |
| Ethyl acetate (77.1) | good | good | poor | good | good | good |
| Acetone (56.1) | good | good | poor | good | good | good |
| Methyl ethyl ketone (79.6) | good | good | poor | good | — | good |
| Diethyl ether (34.5) | — | poor | — | — | — | poor |
| Tetrahydrofuran (65–67) | good | — | good | good | — | good |
| Hexane (68.7) | poor | poor | poor | poor | poor | poor |
| Heptane (98.4) | poor | poor | poor | poor | poor | poor |
| Benzene (80.1) | good | good | good | — | good | poor |
| Toluene (110.6) | good | good | good | poor | good | poor |
| Xylene (139.1) | good | good | good | poor | good | — |
| Chloroform (61.2) | good | good | good | good | good | — |
| Carbon tetrachloride (76.7) | — | — | good | poor | — | — |
| Water (100.0) | poor | poor | poor | poor | poor | poor |

*1 PVC: poly(vinyl chloride)
*2 VCA: vinyl chloride-vinyl acetate copolymer
*3 PB: polybutylene
*4 FS: polystyrene
*5 ANS: acrylonitrile-styrene copolymer
*6 ABS: acrylonitrile-butadiene-styrene copolymer
*7 MAR: methacrylic acid resin
*8 FVA: poly(vinyl acetate)
*9 FC: polycarbonate
*10 AC: acetylcellulose resin
*11 AR: acrylate resin
*12 VB: polyvinyl-butyral In a second embodiment, the heat-sensitive stencil according to the present invention may be prepared as follows. First, a solution of a resin for the porous resin layer in a first solvent is prepared. The solution is applied over a surface of a thermoplastic resin film to form a wet resin coating over the surface. Then, vapors or fine droplets of a second solvent substantially incapable of dissolving the resin are sprayed over the wet resin coating so that the second solvent is taken into the wet resin coating to cause a portion of the resin to precipitate. Thereafter, the resin coating is heated to dryness. The first and second solvents are similar to those described above. In the second embodiment, the size and number of pores may be controlled by the amount and particle size of the droplets of the second solvent. It is preferred that the thermoplastic resin film be previously applied with a spray of the second solvent before being applied with the solvent solution of the resin, since the contact area between the resulting porous resin layer and the thermoplastic resin film is decreased and, therefore, the stencil can be more easily perforated by a thermal head.

If desired, the above first and second methods may be combined for the fabrication of the stencil according to the present invention.

The following examples will further illustrate the present invention. Parts are by weight.

EXAMPLE 1

| | |
|---|---|
| Polyvinyl-butyral (softening point: 87° C.) | 4 parts |
| Ethanol (b.p. 78.3° C.) | 35.5 parts |
| Water (b.p. 100.0° C.) | 11.5 parts |

Figure 4:
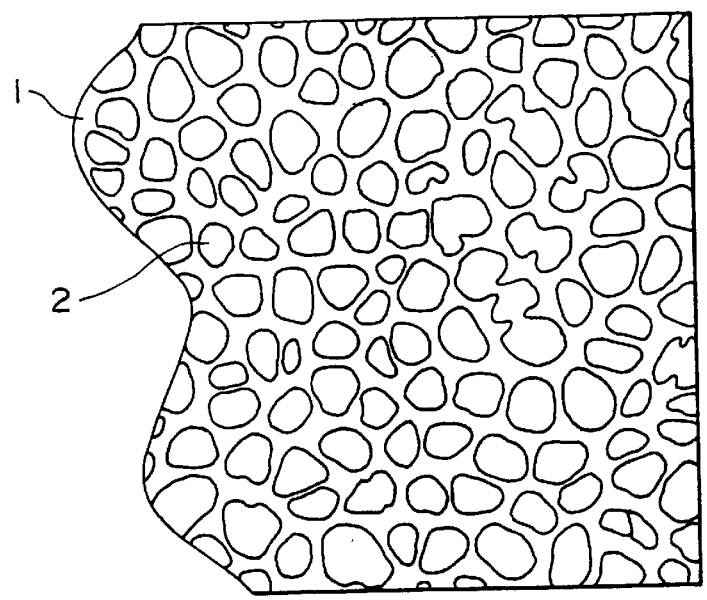
FIGS. 4 and 5 are enlarged view schematically illustrating the openings in the surfaces of heat-sensitive stencils prepared in Examples 1 and 10, respectively.

The above composition was stirred to dissolve the resin in the mixed solvent and allowed to quiescently stand to remove foams. The solution was then uniformly applied to a biaxially stretched polyester film (thickness: 3.5 μm) with a wire bar at a temperature of 30° C. and a relative humidity of 90%, thereby to form a wet coating having a deposition amount of 7.0 g/cm² (on dry basis). This was allowed to stand as such for 1 minute and then placed in a drying chamber at 50° C. for 2 minutes to dry the coating. The dried coating was a porous layer whose surface was as illustrated in FIG. 4. A liquid containing a silicone resin and a cationic antistatic agent was applied on the back side of the polyester film opposite the porous layer and dried to form a stick preventing layer having a deposition amount of 0.05 g/m², thereby obtaining a heat-sensitive stencil A-1 according to the present invention.

EXAMPLE 2

A heat-sensitive stencil A-2 was prepared in the same manner as described in Example 1 except that the following composition was substituted for that of Example 1.

| | |
|---|---|
| Polyvinyl-acetal | 4 parts |
| Ethanol (b.p. 78.3° C.) | 36 parts |
| Water (b.p. 100.0° C.) | 26 parts |

EXAMPLE 3

| | |
|---|---|
| Cellulose acetate butylate (softening point: 83° C.) | 3 parts |
| Methyl ethyl ketone (b.p. 79.6° C.) | 85 parts |

The above composition was stirred to dissolve the resin in the solvent and allowed to quiescently stand to remove foams. The solution was then uniformly applied to a biaxially stretched polyester film (thickness: 3.5 μm) with a wire bar at a temperature of 30° C. and a relative humidity of 90%, thereby to form a wet coating having a deposition amount of 7.0 g/cm² (on dry basis). Fine droplets of water were sprayed for 15 seconds from Humidiffer UV-107D (manufactured by Hitachi Inc.) over the surface of the wet coating placed at a distance 10 cm away from the Humidiffer. This was allowed to stand as such for 1 minute and then placed in a drying chamber at 50° C. for 2 minutes to dry the coating. The dried coating was a porous layer. A liquid containing a silicone resin and a cationic antistatic agent was applied on the back side of the polyester film opposite the porous layer and dried to form a stick preventing layer having a deposition amount of 0.05 g/m², thereby obtaining a heat-sensitive stencil A-3 according to the present invention.

EXAMPLE 4

A heat-sensitive stencil A-4 was prepared in the same manner as described in Example 3 except that the following composition was substituted for that of Example 3.

| | |
|---|---|
| Vinyl chloride-vinyl acetate copolymer (softening point: 83° C.) | 3 parts |
| Methyl ethyl ketone (b.p. 79.6° C.) | 17 parts |
| Methanol (b.p. 64.5° C.) | 9 parts |

EXAMPLE 5

| | |
|---|---|
| Polyvinyl-butyral (softening point: 87° C.) | 4 parts |
| Methanol (b.p. 64.5° C.) | 33.6 parts |
| Water (b.p. 100.0° C.) | 2.8 parts |

The above composition was stirred to dissolve the resin in the mixed solvent and allowed to quiescently stand to remove foams. The resin solution was then uniformly applied to a biaxially stretched polyester film (thickness: 2.0 μm) with a wire bar at a temperature of 20° C., thereby to form a wet coating having a deposition amount of 7.0 g/cm² (on dry basis). This was allowed to stand as such for 15 seconds and then placed in a drying chamber at 50° C. for 1 minute to dry the coating. The dried coating was a porous layer. A liquid containing a silicone resin and a cationic antistatic agent was applied on the back side of the polyester film opposite the porous layer and dried to form a stick preventing layer having a deposition amount of 0.05 g/m², thereby obtaining a heat-sensitive stencil A-5 according to the present invention. During the coating of the resin solution, the temperature on the surface of the polyester film was measured with a thermometer (Digital Surface Thermometer Type E manufactured by Anritsu Inc.). The results are shown below:

| | |
|---|---|
| Temperature of the atmosphere in which the coating was carried out: | 20° C. |
| Temperature of the resin solution immediately before application: | 20° C. |
| Temperature of the resin solution on the film immediately after application: | 17° C.* |

*temperature drop due to evaporation of the solvent

EXAMPLE 6

Example 5 was repeated in the same manner as described except that the application of the resin solution onto the polyester film was carried out using a die coater equipped with a heating jacket under the conditions shown below, thereby obtaining a heat-sensitive stencil A-6.

| | |
|---|---|
| Temperature of the atmosphere in which the coating was carried out: | 20° C. |
| Temperature of the resin solution immediately before application: | 25° C. |
| Temperature of the resin solution on the film immediately after application: | 22° C.* |

*temperature drop due to evaporation of the solvent

EXAMPLE 7

| Polyvinyl-butyral (softening point: 87° C.) | 4 parts |
|---|---|
| Ethanol (b.p. 78.3° C.) | 35.5 parts |
| Water (b.p. 100.0° C.) | 11.5 parts |
| Needle-like magnesium silicate | 0.8 part |

The above composition was mixed with a ball mill to obtain a dispersion. The dispersion was then uniformly applied to a biaxially stretched polyester film (thickness: 1.5 μm) with a wire bar, thereby to form a wet coating having a deposition amount of 7.0 g/cm² (on dry basis). This was placed in a drying chamber at 50° C. for 3 minutes to dry the coating. The dried coating was a porous layer. A liquid containing a silicone resin and a cationic antistatic agent was applied on the back side of the polyester film opposite the porous layer and dried to form a stick preventing layer having a deposition amount of 0.05 g/m², thereby obtaining a heat-sensitive stencil B-1 according to the present invention.

EXAMPLE 8

A heat-sensitive stencil B-2 was prepared in the same manner as described in Example 7 except that the following composition was substituted for that of Example 7.

| Polyvinyl-acetal | 4 parts |
|---|---|
| Ethanol (b.p. 78.3° C.) | 36 parts |
| Water (b.p. 100.0° C.) | 26 parts |
| Platy magnesium silicate (talc) | 0.8 part |

EXAMPLE 9

A heat-sensitive stencil B-3 was prepared in the same manner as described in Example 7 except that the following composition was substituted for that of Example 7.

| Polycarbonate | 4 parts |
|---|---|
| Polyvinyl-butyral | 2.2 parts |
| Tetrahydrofuran | 56 parts |
| Ethanol (b.p. 78.3° C.) | 7.6 parts |
| Potassium titanate whisker | 0.8 part |

EXAMPLE 10

Figure 5:
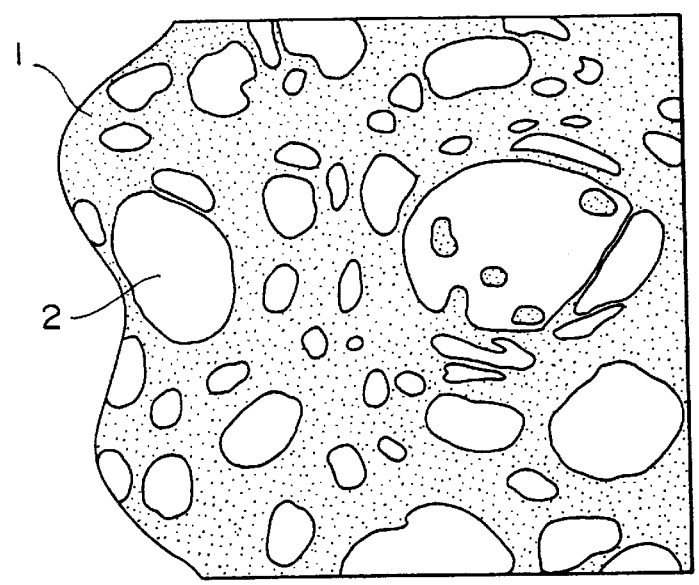

A heat-sensitive stencil B-4 was prepared in the same manner as described in Example 7 except that the following composition was substituted for that of Example 7. The surface of the porous resin layer of the stencil B-4 is illustrated in FIG. 5.

| Vinyl chloride-vinyl acetate copolymer (softening point: 78° C.) | 3 parts |
|---|---|
| Sepiolite | 4 parts |
| Acetone (b.p. 56.1° C.) | 20 parts |
| Ethanol (b.p. 78.3° C.) | 8 parts |

EXAMPLE 11

A heat-sensitive stencil B-5 was prepared in the same manner as described in Example 7 except that the following composition was substituted for that of Example 7.

| Cellulose acetate butylate (softening point: 152° C.) | 3 parts |
|---|---|
| Acetone (b.p. 56.1° C.) | 20 parts |
| Water (b.p. 100.0° C.) | 5 parts |
| Silica powder | 0.3 part |

EXAMPLE 12

A heat-sensitive stencil B-6 was prepared in the same manner as described in Example 7 except that the following composition was substituted for that of Example 7.

| Polyvinyl-butyral (softening point: 87° C.) | 4 parts |
|---|---|
| Ethanol (b.p. 78.3° C.) | 24.5 parts |
| Water (b.p. 100.0° C.) | 11.5 parts |
| Acrylic acid-styrene copolymer (softening point: 65° C.) | 0.6 part |
| Titanium oxide (rutile) | 0.8 part |

Comparative Example 1

| Cellulose acetate butylate (softening point: 131° C.) | 15 parts |
|---|---|
| Methyl ethyl ketone (b.p. 79.6° C.) | 5 parts |

The above composition was stirred to dissolve the resin in the solvent and allowed to quiescently stand to remove foams. The solution was then uniformly applied to a biaxially stretched polyester film (thickness: 3.5 μm) with a wire bar at a temperature of 20° C. and a relative humidity of 60%, thereby to form a wet coating. This was allowed to stand as such for 1 minute and then placed in a drying chamber at 50° C. for 2 minutes to dry the coating. A liquid containing a silicone resin and a cationic antistatic agent was applied on the back side of the polyester film opposite the dried layer and dried to form a stick preventing layer having a deposition amount of 0.05 g/m², thereby obtaining a heat-sensitive stencil C-1.

Comparative Example 2

A paper formed of natural jute (Manila hemp) fibers and synthetic fibers was bonded with an adhesive to a biaxially stretched polyester film (thickness: 3.5 μm), thereby obtaining a heat-sensitive stencil C-2.

Comparative Example 3

A heat-sensitive stencil C-3 was prepared in the same manner as described in Comparative Example 1 except that the following composition was substituted for that of Comparative Example 1.

| Acrylic acid-styrene copolymer (O/W emulsion; resin content: 43%; softening point: 47° C.) | 16 parts |
|---|---|
| Water (b.p. 100.0° C.) | 33 parts |
| Colloidal silica (average particle diameter: 0.015 μm) | 3 parts |

Comparative Example 4

A liquid containing a silicone resin and a cationic antistatic agent was applied on one side of a biaxially stretched polyester film (thickness: 3.5 μm) and dried to form a stick preventing layer having a deposition amount of 0.05 g/m², thereby obtaining a heat-sensitive stencil C-4.

Comparative Example 5

A liquid containing a silicone resin and a cationic antistatic agent was applied on one side of a biaxially stretched polyester film (thickness: 7.0 μm) and dried to form a stick preventing layer having a deposition amount of 0.05 g/m², thereby obtaining a heat-sensitive stencil C-5.

Each of the heat-sensitive stencils A-1 to A-6, B-1 to B-6 and C-1 to C-5 was measured for (a) the air permeability at various open ratios $S_O/S_P$ of 0.2–0.8 ($S_O$ and $S_P$ are as defined previously), (b) percentage S1 of the total area of the openings having an equivalent diameter of at least 5 μm relative to a total area of the surface of the porous resin layer, and (c) percentage S2 of the total area of the openings having an equivalent diameter of at least 5 μm relative to a total area of the openings in the manner described previously. The results are summarized in Table 2.

TABLE 2

| Stencil | $S_o/S_p$ (%) | Air Permeability (cm³/cm² · sec) | S1 (%) | S2 (%) |
|---|---|---|---|---|
| A-1 | 21 | 15 | 47 | 73 |
|  | 32 | 32 |  |  |
|  | 48 | 50 |  |  |
|  | 63 | 65 |  |  |
|  | 78 | 82 |  |  |
| A-2 | 22 | 3 | 3 | 38 |
|  | 35 | 8 |  |  |
|  | 51 | 14 |  |  |
|  | 66 | 24 |  |  |
|  | 81 | 34 |  |  |
| A-3 | 20 | 4 | 85 | 45 |
|  | 37 | 9 |  |  |
|  | 45 | 14 |  |  |
|  | 63 | 20 |  |  |
|  | 77 | 26 |  |  |
| A-4 | 20 | 136 | 2 | 53 |
|  | 26 | 140 |  |  |
|  | 45 | 152 |  |  |
|  | 58 | 163 |  |  |
|  | 78 | 175 |  |  |
| A-5 | 23 | 19 | 52 | 89 |
|  | 38 | 26 |  |  |
|  | 53 | 34 |  |  |
|  | 67 | 46 |  |  |
|  | 83 | 53 |  |  |
| A-6 | 21 | 9 | 58 | 93 |
|  | 38 | 18 |  |  |
|  | 52 | 28 |  |  |
|  | 67 | 37 |  |  |
|  | 82 | 46 |  |  |
| B-1 | 24 | 23 | 53 | 78 |
|  | 32 | 34 |  |  |
|  | 46 | 42 |  |  |
|  | 69 | 72 |  |  |
|  | 87 | 85 |  |  |
| B-2 | 22 | 0.3 | 2 | 41 |
|  | 34 | 2.4 |  |  |
|  | 51 | 4 |  |  |
|  | 66 | 8 |  |  |
|  | 82 | 14 |  |  |
| B-3 | 21 | 124 | 15 | 95 |
|  | 36 | 142 |  |  |
|  | 51 | 164 |  |  |
|  | 66 | 183 |  |  |
|  | 82 | 200 |  |  |
| B-4 | 21 | 134 | 3 | 58 |
|  | 38 | 147 |  |  |
|  | 52 | 155 |  |  |
|  | 67 | 167 |  |  |
|  | 81 | 177 |  |  |

TABLE 2-continued

| Stencil | $S_o/S_p$ (%) | Air Permeability (cm³/cm² · sec) | S1 (%) | S2 (%) |
|---|---|---|---|---|
| B-5 | 24 | 6 | 87 | 44 |
|  | 45 | 10 |  |  |
|  | 53 | 15 |  |  |
|  | 68 | 22 |  |  |
|  | 83 | 28 |  |  |
| B-6 | 20 | 43 | 60 | 99 |
|  | 32 | 49 |  |  |
|  | 45 | 56 |  |  |
|  | 62 | 62 |  |  |
|  | 77 | 70 |  |  |
| C-1 | 30 | 0.8 | 0 | 0 |
| C-2 | 50 | 220 | — | — |
| C-3 | 10 | 0.05 | — | — |
| C-4 | 25 | 300 | — | — |
| C-5 | — | — | — | — |

Each of the heat-sensitive stencils A-1 to A-6, B-1 to B-6 and C-1 to C-5 was further measured for bonding strength, flexural rigidity, perforation sensitivity, print uniformity and ink stain. The test results are summarized in Table 3 and the test methods are shown below. The preparation of printing masters and mimeographic printing using same in these tests were carried out using a commercially available printer (VT3820 manufactured by Ricoh Company Ltd.) and an ink (VT600 II manufactured by Ricoh Company Ltd., viscosity at 20° C.: 153 poise).

Bonding Strength

Bonding strength between the thermoplastic resin film and the support (porous resin layer in the case of the present invention) is measured by perforating a sample stencil with a thermal head to see whether or not the support is separated from the thermoplastic resin film. Evaluation is made according to the following ratings:

A: no separation

B: slight separation

C: significant separation

Flexural Rigidity

Flexural rigidity is measured with Lorentzen Stiffness Tester. A stencil having a flexural rigidity of less than 5 mN is ill-suited for actual use.

Perforation Sensitivity

A sample stencil is subjected to perforation with a thermal head. Perforation sensitivity is evaluated according to the following ratings:

A: completely normally perforated

B: completely perforated but diameters are reduced

C: not completely perforated

D: hardly perforated

Print Uniformity

Prints obtained using sample stencils are compared with those obtained using a commercially available stencil (VT2 Master manufactured by Ricoh Company Ltd.) with respect to absence of blurs and of density variation. Evaluation is made according to the following ratings:

A: much superior

B: slightly better

C: comparable

D: inferior

Ink Stain

Prints obtained using sample stencils are compared with those obtained using a commercially available stencil (VT2 Master manufactured by Ricoh Company Ltd.) with respect to absence of ink stains on both sides thereof. Evaluation is made according to the following ratings:

A: much superior
B: slightly better
C: comparable
D: inferior

TABLE 3

| Stencil | Bonding Strength | Flexural Rigidity (mN) | Perforation Sensitivity | Print Uniformity | Ink Stain |
|---|---|---|---|---|---|
| A-1 | B | 15 | B | B | B |
| A-2 | B | 16 | C | C | A |
| A-3 | B | 16 | B | C | B |
| A-4 | A | 19 | C | B | C |
| A-5 | A | 19 | A | A | A |
| A-6 | A | 17 | A | A | A |
| B-1 | B | 28 | B | B | B |
| B-2 | B | 30 | C | C | A |
| B-3 | B | 34 | C | B | C |
| B-4 | A | 28 | C | B | C |
| B-5 | A | 32 | B | C | B |
| B-6 | A | 29 | A | A | A |
| C-1 | A | 10 | B | D | — |
| C-2 | A | 90 | D | C | D |
| C-3 | B | 4 | C | D | — |
| C-4 | B | 1 | A | C | C |
| C-5 | B | 6 | D | D | — |

No porous resin layer is formed in stencil of comparative examples. In the case of stencil C-5, the fill was too thick to be perforated. The stencil C-4 had so small stiffness that it was difficult to automatically transfer the stencil in the printer.

EXAMPLE 13

Figure 6:
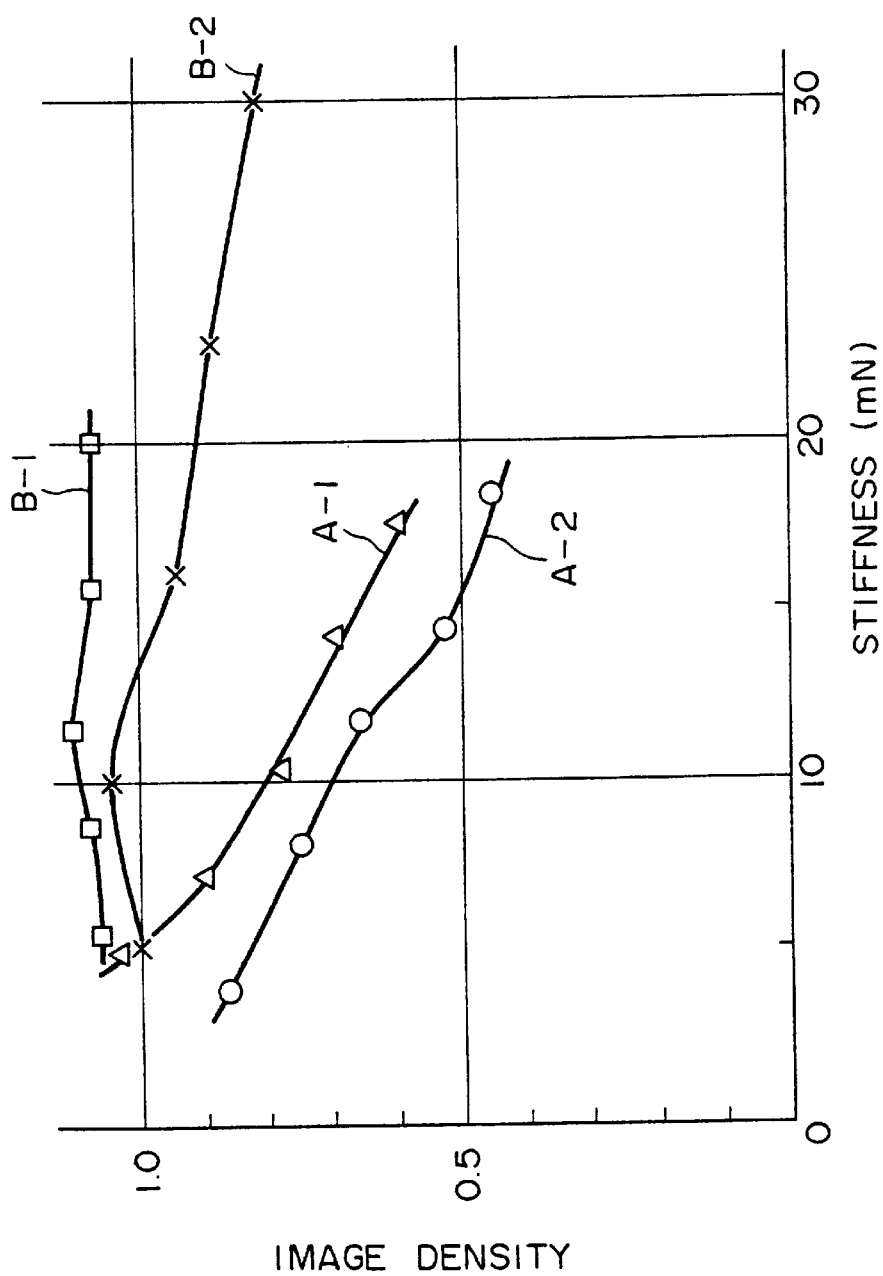
FIG. 6 is a graph showing a relationship between image density and flexural rigidity of heat-sensitive stencils according to the present invention.

Examples 1 and 2 were repeated in the same manner as described except that the deposition amount of the porous resin layer was varied. Each stencil was perforated and subjected to mimeographic printing and also measured for the flexural rigidity. The relationship between flexural rigidity and image density is shown in FIG. 6. The curves A-1 and A-2 are the results of the variation of Examples 1 and 2, respectively.

EXAMPLE 14

Examples 7 and 8 were repeated in the same manner as described except that the amount of the filler was varied. Each stencil was perforated and subjected to mimeographic printing and also measured for the flexural rigidity The relationship between flexural rigidity and image density is shown in FIG. 6. The curves B-1 and B-2 are the results of the variation of Examples 7 and 8, respectively.

As will be appreciated from the results shown in FIG. 6, the image density is little changed by increasing the stiffness by increasing the amount of the filler. On the other hand, the image density decreases by increasing the stiffness by increasing the thickness of the porous resin layer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of preparing a heat-sensitive stencil, comprising:

(a) applying a solution of a resin in a first solvent over a surface of a thermoplastic resin film to form a wet resin coating over said surface;

(b) spraying vapors or fine droplets of a second solvent substantially incapable of dissolving said resin over said wet resin coating so that said second solvent is taken into said wet resin coating to cause a portion of said resin to precipitate; and (c) heating said resin coating to dryness to create a heat-sensitive stencil with a porous resin layer.

2. A method as claimed in claim 1, wherein said second solvent has an evaporation rate lower than that of said first solvent.

3. A method as claimed in claim 1, wherein said second solvent is water or an aqueous alcohol.

4. The method as claimed in claim 1 further comprising (d) providing perforations in said thermoplastic resin film.

5. The method as claimed in claim 4, wherein said perforations are provided by a thermal head at a temperature of less than 150° C.

6. The method as claimed in claim 1, wherein after heating the resin coating to dryness said resin coating has a thickness that when the thermoplastic resin film is perforated to form a plurality of perforations providing an open ratio $S_O/S_p$ of 0.2–0.8, at least a part of said resin coating in each of said perforations remains unperforated, wherein $S_O$ represents a total area of said perforations and $S_p$ represents the area of said position.

7. The method as claimed in claim 1 wherein said stencil has an air permeability in the range of 1.0 cm³/cm²·sec to 157 cm³/cm²·sec in a portion thereof when said thermoplastic resin film of said portion is perforated to form a plurality of perforations providing an open ratio $S_O/S_p$ of at least 0.2, wherein $S_0$ represents a total area of said perforations and $S_p$ represents the area of said portion.

8. The method as claimed in claim 1, wherein said resin is a resin selected from the group consisting of vinyl resin, poly(vinyl chloride), poly(vinyl butyral), vinyl chloride-vinyl acetate copolymer, vinyl chloride-vinylidene chloride polymer, vinyl chloride-acrylonitrile copolymer, polyamide resin, nylon, polybutylene, polyphenylene oxide, (meth) acrylic ester, polycarbonate, cellulose derivative, acetylcellulose, acetylbutylcellulose, and acetylpropylcellulose.

9. The method as claimed in claim 1, wherein the second solvent has a boiling point from 10 to 40° C. higher than a boiling point of the first solvent.

10. The method as claimed in claim 9, wherein the second solvent has a boiling point of less than 150° C.

11. The method as claimed in claim 1, wherein a concentration of the resin in the solution is from 5 to 30% by weight.

12. The method as claimed in claim 1, wherein the solution further comprises a filler.

13. The method as claimed in claim 1, wherein the solvent is applied to the thermoplastic resin film using a technique selected from the group consisting of die coating, blade coating, transfer roll coating, wire bar coating, reverse roll coating and gravure coating.

14. The method as claimed in claim 1, wherein said coating liquid immediately before being applied is heated at a temperature higher than that of the atmosphere at which step (b) is performed.

15. The method as claimed in claim 1, wherein said coating liquid immediately after being applied is cooled before step (c).

16. The method as claimed in claim 1, further comprising applying the second solvent to the thermoplastic film before applying the solution of a resin to the thermoplastic film.

* * * * *